United States Patent
. et al.

(10) Patent No.: US 9,998,733 B2
(45) Date of Patent: Jun. 12, 2018

(54) IMAGE DISPLAYING METHOD (71) Applicant: AU OPTRONICS CORP., Hsin-Chu (TW)

(72) Inventors: Effendi ., Hsin-Chu (TW); Fu-Chuan Tsai, Hsin-Chu (TW); Chia-Pu Ho, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 581 days.

(21) Appl. No.: 14/595,603

(22) Filed: Jan. 13, 2015

(65) Prior Publication Data
US 2016/0021365 A1 Jan. 21, 2016

(30) Foreign Application Priority Data
Jul. 18, 2014 (TW) .............................. 103124786 A (51) Int. Cl.
*H04N 13/04* (2006.01)
*H04N 13/00* (2018.01)

(52) U.S. Cl.
CPC ..... *H04N 13/0447* (2013.01); *H04N 13/0022* (2013.01); *H04N 13/047* (2013.01)

(58) Field of Classification Search
CPC ........... H04N 13/0447; H04N 13/0022; H04N 13/047
See application file for complete search history.

(56) References Cited

U.S. PATENT DOCUMENTS

| | | | | |
|---|---|---|---|---|
| 6,163,336 A * | 12/2000 | Richards | ............ | G02B 27/0093 348/42 |
| 7,058,252 B2 * | 6/2006 | Woodgate | .......... | G02B 27/2214 348/E13.029 |
| 7,557,824 B2 * | 7/2009 | Holliman | ........... | H04N 13/0003 345/419 |
| 7,787,009 B2 * | 8/2010 | Alpaslan | ................. | G06F 3/011 348/51 |
| 7,986,320 B2 * | 7/2011 | Fukushima | .......... | H04N 13/026 345/419 |
| 8,284,335 B2 * | 10/2012 | Kim | ................... | G02B 27/2214 345/205 |
| 8,330,802 B2 * | 12/2012 | Koppal | ............. | H04N 13/0003 348/46 |
| 8,384,774 B2 * | 2/2013 | Gallagher | .......... | H04N 13/0431 348/53 |
| 8,537,206 B2 | 5/2013 | Son et al. | | |

(Continued)

FOREIGN PATENT DOCUMENTS

| | | |
|---|---|---|
| CN | 103152595 | 6/2013 |
| CN | 103388885 | 11/2013 |
| WO | 2013060677 | 5/2013 |

*Primary Examiner* — Sath V Perungavoor
*Assistant Examiner* — Philip Dang
(74) *Attorney, Agent, or Firm* — WPAT, PC (57) ABSTRACT

An image displaying method includes the following steps. A first depth setting command is received from a first viewer who observes a first disparity between two images through two view angles in front of a stereoscopic display having N view angles. A second depth setting command is received from a second viewer who observes a second disparity between two images through another two view angles. The stereoscopic display is configured to adjust at least one image among its N view angles, thereby making the first disparity different from the second disparity.

7 Claims, 7 Drawing Sheets

(56) References Cited

U.S. PATENT DOCUMENTS

| | | | |
|---|---|---|---|
| 8,654,182 B2 * | 2/2014 | Ishikawa | G02B 27/2214 348/42 |
| 8,692,871 B2 * | 4/2014 | Harrold | G02B 27/225 348/51 |
| 8,723,929 B2 * | 5/2014 | Chen | G03B 35/18 348/51 |
| 8,749,691 B2 * | 6/2014 | Tateishi | G06K 9/6202 348/155 |
| 8,754,829 B2 * | 6/2014 | Lapstun | H04N 13/0402 345/419 |
| 8,780,013 B2 * | 7/2014 | Nam | G02F 1/133615 345/102 |
| 2005/0053274 A1 * | 3/2005 | Mayer | G03B 21/18 382/154 |
| 2005/0275942 A1 * | 12/2005 | Hartkop | H04N 13/0409 359/464 |
| 2007/0176914 A1 | 8/2007 | Bae et al. | |
| 2010/0259819 A1 * | 10/2010 | Hiddink | G02B 27/2242 359/463 |
| 2011/0001804 A1 * | 1/2011 | Urey | G02B 27/225 348/51 |
| 2011/0157167 A1 * | 6/2011 | Bennett | G06F 3/14 345/419 |
| 2011/0157168 A1 * | 6/2011 | Bennett | G06F 3/14 345/419 |
| 2011/0157471 A1 * | 6/2011 | Seshadri | G06F 3/14 348/564 |
| 2011/0159929 A1 * | 6/2011 | Karaoguz | H04N 13/0404 455/566 |
| 2011/0199469 A1 * | 8/2011 | Gallagher | H04N 13/0285 348/60 |
| 2011/0304533 A1 * | 12/2011 | Kim | G02B 3/12 345/156 |
| 2012/0056875 A1 * | 3/2012 | Lee | G06F 3/012 345/419 |
| 2012/0084652 A1 | 4/2012 | Martinez Bauza et al. | |
| 2012/0236133 A1 * | 9/2012 | Gallagher | H04N 13/0018 348/60 |
| 2012/0257018 A1 * | 10/2012 | Shigemura | G02B 27/2214 348/46 |
| 2012/0257025 A1 * | 10/2012 | Kim | H04N 13/0497 348/51 |
| 2012/0262555 A1 * | 10/2012 | Chien | H04N 21/44008 348/51 |
| 2013/0010057 A1 * | 1/2013 | Borel | H04N 13/0022 348/42 |
| 2013/0093849 A1 | 4/2013 | He et al. | |
| 2013/0242068 A1 * | 9/2013 | Horiuchi | G02B 27/2228 348/55 |
| 2014/0098183 A1 * | 4/2014 | Smith | H04N 7/157 348/14.16 |
| 2014/0111854 A1 * | 4/2014 | Kroon | G02B 27/2214 359/463 |
| 2014/0125660 A1 * | 5/2014 | Redmann | G06T 3/40 345/419 |

* cited by examiner

IMAGE DISPLAYING METHOD

RELATED APPLICATIONS

This application claims priority to Taiwan Application Serial Number 103124786, filed Jul. 18, 2014, which is herein incorporated by reference.

BACKGROUND

Field of Invention

The present disclosure relates to a displaying device, and more particularly, to a stereoscopic image displaying device and an image displaying method thereof.

Description of Related Art

In the field of stereoscopic displaying technology, an auto-stereoscopic displaying device can present a three dimensional (3D) image even though a viewer does not wear a 3D glass. As a result, the auto-stereoscopic displaying device has been gradually recognized as a better stereoscopic displaying technology. The most common auto-stereoscopic displaying device may apply a lenticular lens to project different images to different view angles. When a left eye and a right eye of a viewer are in two different view angles, the viewer can perceive a 3D image effect because of the binocular disparity between the image received by the right eye and the image received by the left eye.

However, when multiple viewers view the auto-stereoscopic displaying device from different view angles, the auto-stereoscopic displaying device can merely provide a consistent 3D image effect to each of the viewers, and cannot provide customized 3D image effects to the respective viewers with different 3D image effects.

SUMMARY

One aspect of the present disclosure is to provide a stereoscopic displaying method. The stereoscopic displaying method is adapted to operate on a stereoscopic display. The stereoscopic display includes N view angles, in which N is a natural number greater than 3. The image displaying method includes the following steps (it is noted that the order of the steps described in the present embodiment, unless otherwise specified, may be changed as required, or the steps or part of the steps may be performed simultaneously):

receiving a first depth setting command from a first viewer, in which there is a first disparity between two images which are observed by the first viewer through two of the N view angles;

receiving a second depth setting command from a second viewer, in which there is a second disparity between two images which are observed by the second viewer through two of the N view angles;

adjusting at least one image provided by at least one of the N view angles of the stereoscopic display according to the first depth setting command and the second depth setting command, thereby making the first disparity different from the second disparity.

As a result, under the case of multiple viewers, the image displaying method can present different image depths according to each of the viewers' requirements, so that each of the viewers could perceive the 3D image effects of different image depths.

Further, in one aspect of the present disclosure, the image displaying method further includes the following steps:

receiving a first depth setting command from a first viewer, in which there is a first disparity between two images which are observed by the first viewer through two of the N view angles;

receiving a second depth setting command from a second viewer, in which there is a second disparity between two images which are observed by the second viewer through two of the N view angles, and two view angles corresponding to the first viewer both overlap with two view angles corresponding to the second viewer;

outputting a depth setting result according to the first depth setting command, the second depth setting command and two weighting parameters respectively corresponding to the first depth setting command and the second depth setting command;

adjusting the two images provided by two of the N view angles corresponding to the first viewer and the second viewer according to the depth setting result.

As a result, if there are two or more viewers in the same two view angles of the stereoscopic display, and all of the viewers transmit their own depth setting commands, the image displaying method could provide a suitable 3D image effect according to each of the viewers' depth setting commands.

Another aspect of the present disclosure is to further provide an image displaying device. The image displaying device includes a stereoscopic display, a viewer tracking module and a multi-view rendering module. The stereoscopic display is configured to provide N view angles, in which N is a natural number greater than 3. The viewer tracking module is configured to receive a first depth setting command of the first viewer and a second depth setting command of the second viewer, in which the first viewer observes the first disparity between the two images through the two of the N view angles, and the second viewer observes the second disparity between the two images through another two of the N view angles. The multi-view rendering module is configured to adjust at least one image provided by at least one of the N view angles of the stereoscopic display according to the first depth setting command and the second depth setting command.

An image displaying device is provided according to yet another embodiment of the present disclosure. The image displaying device includes a stereoscopic display, a viewer tracking module and a multi-view rendering module. The stereoscopic display is configured to provide N view angles, in which N is a natural number greater than 3. The viewer tracking module is configured to receive a first depth setting command and a second depth setting command. The multi-view rendering module is configured to adjust at least one image of the N view angles of the stereoscopic display according to the first depth setting command and the second depth setting command, thereby making two images provided by two of the N view angles have a first disparity, and making two images provided by another two of the N view angles have a second disparity.

In one or more specific embodiments, the viewer tracking module receives the first depth setting command from a first viewer, and receives the second depth setting command from a second viewer. The first viewer observes the first disparity between the two images through the two of the N view angles, and the second viewer observes the second disparity between the two images through the another two of the N view angles.

In one or more specific embodiments, the image displaying device further includes a view and depth pairing module. The view and depth pairing module is configured to output N-1 depth setting results according to the first depth setting command and the second depth setting command, and the multi-view rendering module is configured to adjust the at least one image provided by the at least one of the N view angles of the stereoscopic display according to the N-1 depth setting results.

In one or more specific embodiments, the first depth setting command includes a first depth setting value, and the second depth setting command includes a second depth setting value. The multi-view rendering module further includes an image shifting unit and a processing unit. The image shifting unit is configured to normalize a first predetermined depth value to the first depth setting value and to normalize a second predetermined depth value to the second depth setting value. The processing unit is configured to respectively adjust the first disparity and the second disparity according to the first depth setting value and the second depth setting value.

Through the image displaying device and the image displaying method described above, when the viewers are in different view angles, each of the viewers may independently adjust the 3D effect of the image according to their own requirements. Furthermore, the stereoscopic display respectively receives each of the viewers' depth setting commands, and independently adjusts the disparity between the two images received by each viewer according to each viewer's depth setting command.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

First of all, the following embodiments disclose an image displaying device and an image displaying method that are capable of displaying a stereoscopic image even though a viewer does not wear any 3D glass. In other words, when a viewer watches the image displaying device disclosed by the following embodiments or applies the image displaying method disclosed by the following embodiments to watch a video, the viewer can perceive a 3D displaying effect with naked eyes.

Furthermore, the image displaying device of the following embodiments and the stereoscopic display mentioned in the image displaying method are an auto-stereoscopic display with multiple view angles. More specifically, some optical devices can be applied to the auto-stereoscopic display to project different images to different view angles in front of the display, such as lenticular lens or parallax barrier. Therefore, when a viewer's eyes are in different view angles in front of the auto-stereoscopic display, the right eye and the left eye can receive different images resulting in disparity between the two eyes, and thus the viewer can perceive a 3D image without wearing a 3D glass. In following embodiments, the stereoscopic display is capable of independently adjusting the disparity between two images provided by two view angles, so that different viewers in front of the stereoscopic display can observe the 3D image having different depth effects according to their own requirement.

Figure 1:
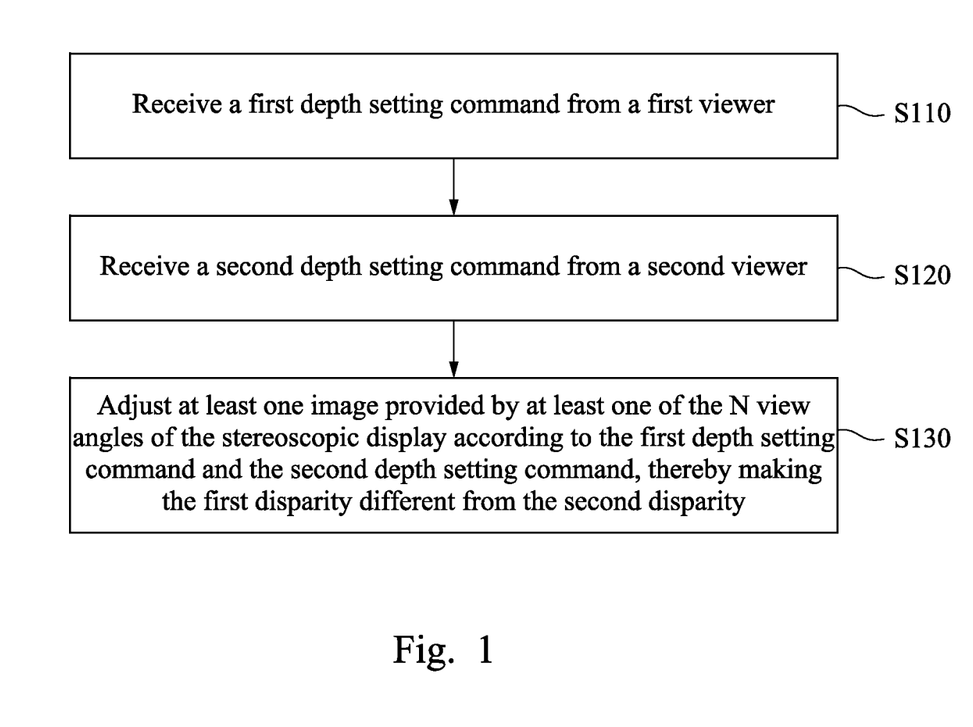
FIG. 1 is a flow chart of an image displaying method according to one embodiment of the present disclosure.
Figure 2:
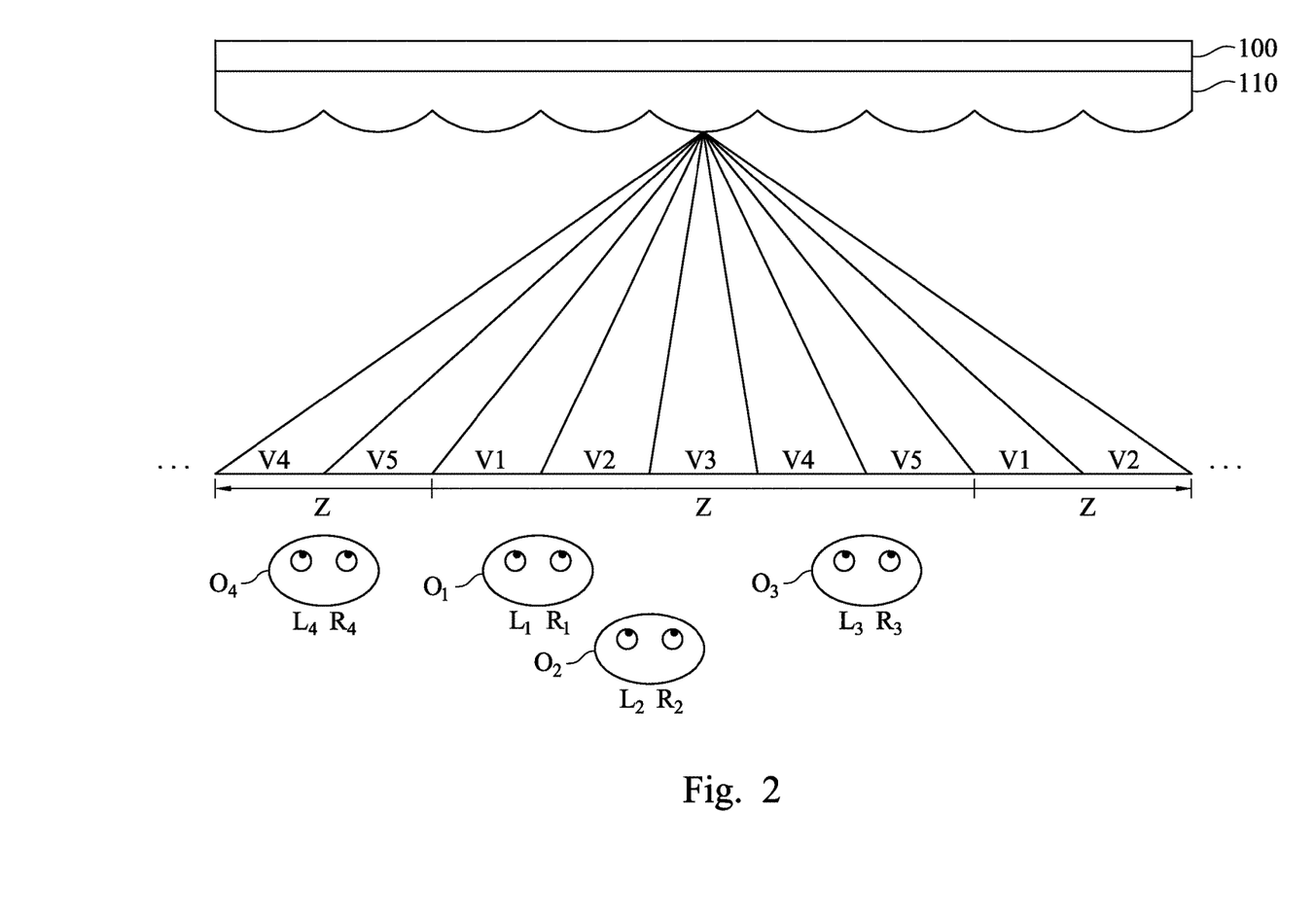
FIG. 2 is a schematic diagram showing a stereoscopic display and viewers according to one embodiment of the present disclosure.

FIG. 1 is a flow chart of an image displaying method according to one embodiment of the present disclosure. FIG. 2 is a schematic diagram showing a stereoscopic display 100 and viewers according to one embodiment of the present disclosure. With reference made to FIG. 1 and FIG. 2, the stereoscopic display 100 includes five view angles V1, V2, V3, V4, V5, but is not limited thereto. In other embodiments, the stereoscopic display 100 may have N view angles, in which N is a natural number.

It is noted that the view angles V1, V2, V3, V4, V5 of the stereoscopic display 100 of the present embodiment are sequentially and periodically arranged. That is, there are not only five areas in front of the stereoscopic display 100 at which five different images with the view angles V1, V2, V3, V4, V5 can be seen, and there are many areas in front of the stereoscopic display 100 at which the image with the view angle V1. Similarly, the images with the view angles V2, V3, V4, V5 can be seen at many different areas. In other words, if five successive view angles V1, V2, V3, V4, V5 are considered as one displaying area Z in front of the stereoscopic display 100, there are a plurality of displaying areas Z in front of the stereoscopic display 100 of the present embodiment.

Furthermore, in present embodiment, a lenticular lens 110 may be used in the stereoscopic display 100 to project five different images onto five different view angles V1, V2, V3, V4, V5, in which the view angles V1, V2, V3, V4, V5 are arranged repeatedly in front of the stereoscopic display 100, and five different images are also projected to the view angles V1, V2, V3, V4, V5 repeatedly. In other embodiments, a parallax barrier or another spatial-multiplexed method may be used in the stereoscopic display 100 to generate the different view angles with different images. In one embodiment, the stereoscopic display 100 has five pixel sets, and different pixel sets can be used to display different images. For example, the images of five pixel sets have different disparities, and the lenticular lens 110 can be used to project the images of five pixel sets onto the view angles V1, V2, V3, V4, V5 respectively. Therefore, when a viewer watches the stereoscopic display 100 at two different view angles, the right eye and the left eye see different images, and thus the viewer can perceive the 3D image effect.

With reference made to FIG. 1, the image displaying method of the present embodiment is adapted to operate on the stereoscopic display 100 of FIG. 2. The image displaying method includes the following steps (it is noted that the order of the steps described in the present embodiment, unless otherwise specified, may be changed as required, or the steps or part of the steps may be performed simultaneously).

Step S110 is performed to receive a first depth setting command $D_1$ (illustrated in FIG. 5) from a first viewer $O_1$. The first viewer $O_1$ observes a first disparity between two images through two of the N view angles. For example, the first viewer $O_1$ in FIG. 2 sees the left eye image $L_1$ through the first view angle V1, and sees the right eye image $R_1$ through the second view angle V2, in which there is a first disparity between the left eye image $L_1$ and the right eye image $R_1$.

Step S120 is performed to receive a second depth setting command $D_2$ (illustrated in FIG. 5) from a second viewer $O_2$. The second viewer $O_2$ observes a second disparity between two images through two of the N view angles. For example, the second viewer $O_2$ in FIG. 2 sees the left eye image $L_2$ through the second view angle V2, and sees the right eye image $R_2$ through the third view angle V3, in which there is a second disparity between the left eye image $L_2$ and the right eye image $R_2$.

Step S130 is performed to adjust at least one image provided by at least one of the N view angles of the stereoscopic display 100 according to the first depth setting command $D_1$ and the second depth setting command $D_2$, thereby making the first disparity different from the second disparity. For example, after the stereoscopic display 100 in FIG. 2 receives the first depth setting command $D_1$ and the second depth setting command $D_2$, the image of the second view angle V2 can be adjusted, so as to make the first disparity different from the second disparity. Therefore, the first viewer $O_1$ and the second viewer $O_2$ observe different disparities according to their own depth setting commands.

Briefly speaking, when there are multiple viewers, the image displaying method and the image displaying device can present different image depths in response to each of the viewers' requests. More specifically, in one example, the image displayed by the corresponding pixels can be adjusted independently according to the request of each viewer, and thus the images displayed by different pixel sets corresponding to different view angles have different disparities therebetween. After those images are projected onto different view angles V1, V2, V3, V4, V5 by the lenticular lens 110, each of the viewers observe the 3D image with different image depths. In practice, the viewer may transmit depth setting commands to the stereoscopic display 100 in a variety of ways, such as by a remote controller or by detecting the hand gestures of the viewer and determining whether the viewer want to change the image depth or not.

Figure 3:
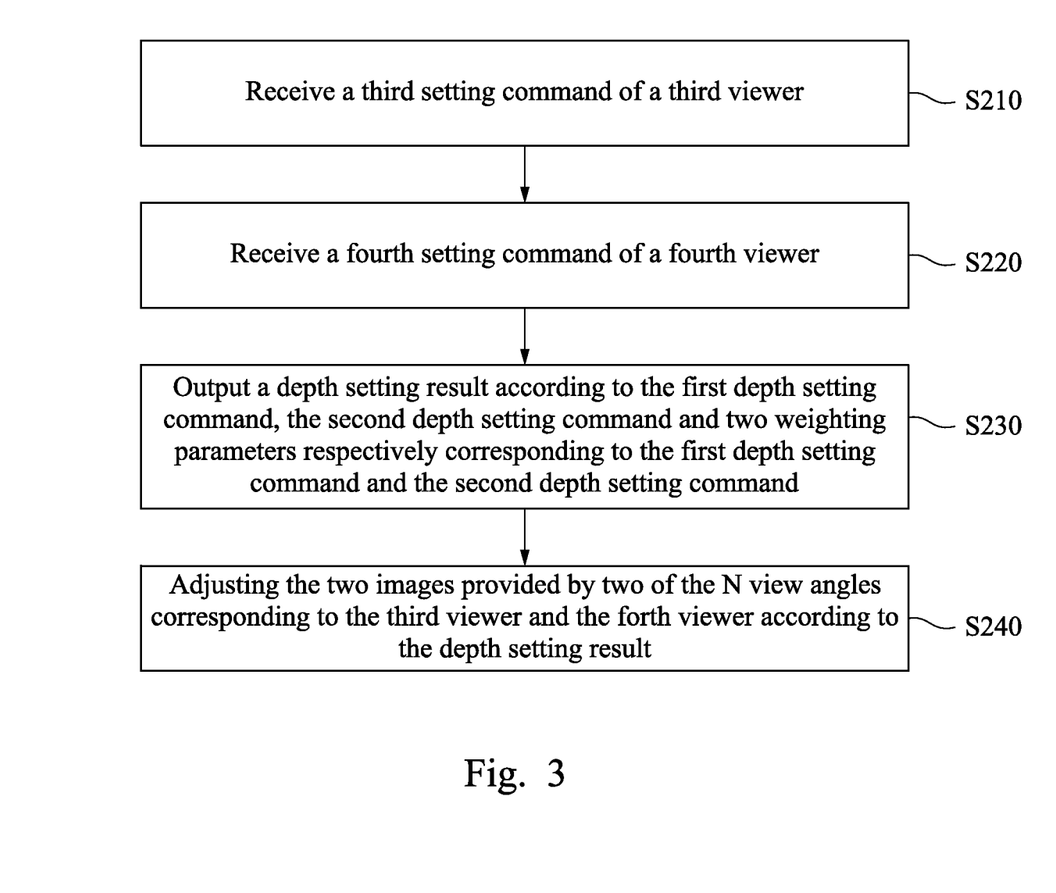
FIG. 3 is a flow chart of the image displaying method according to another embodiment of the present disclosure.

In some embodiments, if there are multiple viewers in the same two view angles of the stereoscopic display 100, the stereoscopic display 100 is also capable of providing a suitable 3D image effect to the viewers. FIG. 3 is a flow chart of the image displaying method according to another embodiment of the present disclosure. With reference made to FIG. 2 and FIG. 3, in two different displaying areas Z, two view angles of a third viewer $O_3$ and a fourth viewer $O_4$ are the same. For example, the third viewer $O_3$ and the fourth viewer $O_4$ are in the fourth view angle V4 and the fifth view angle V5, but are in different displaying areas Z. The image displaying method further includes following steps.

Step S210 is performed to receive a third depth setting command of a third viewer $O_3$. The third viewer $O_3$ observes a third disparity between two images through two of the N view angles. For example, the third viewer $O_3$ in FIG. 2 sees the left eye image $L_3$ through the fourth view angle V4, and sees the right eye image $R_3$ through the fifth view angle V5, in which there is a third disparity between the left eye image $L_3$ and the right eye image $R_3$.

Step S220 is performed to receive a fourth depth setting command of a fourth viewer $O_4$. The fourth viewer $O_4$ perceives a fourth disparity through two images of two of the N view angles. For example, in FIG. 2, the fourth viewer $O_4$ is in different displaying area Z from the third viewer $O_3$ and sees the left eye image $L_4$ and the right eye image $R_4$ through the fourth view angle V4 and the fifth view angle V5, in which there is a fourth disparity between the left eye image $L_4$ and the right eye image $R_4$. In this example, the third disparity is the same as the fourth disparity.

Step S230 is performed to output a depth setting result according to the first depth setting command, the second depth setting command and two weighting parameters respectively corresponding to the first depth setting command and the second depth setting command. For example, a third depth setting value is included in the third depth setting command, and a fourth depth setting value is included in the fourth depth setting command. The depth setting value contains information relating to the distance of an object from a view angle. By adjusting the depth setting value, the disparity, e.g. the displacement, of two adjacent images of an object can be changed, and when the left eye and the right eye of a viewer receives two images having the disparity, the viewer can perceive the 3D effect. In practice, the depth setting value of an object can be recorded as a depth map. The depth map is a greyscale image. The pixel depth of the greyscale image is arranged from 0 to 255. The pixel depth is relevant to the distance of an object from a view angle. The stereoscopic display 100 performs a weighting calculation on the third depth setting command and a fourth depth setting command to obtain a weighting depth value, and the weighting depth value is included in the depth setting result.

Step S240 is performed to adjust the two images provided by two of the N view angles corresponding to the third viewer $O_3$ and the fourth viewer $O_4$ according to the depth setting result. For example, in the embodiment of FIG. 2, two images of the fourth view angle V4 and the fifth view angle V5 in different displaying areas Z can be adjusted respectively, so that the disparity between images of the fourth view angle V4 and the fifth view angle V5 is consistent with the depth setting result. Further, because the third viewer $O_3$ and the fourth viewer $O_4$ have the same view angles V4, V5, the third disparity and the fourth disparity observed by the third viewer $O_3$ and the fourth viewer $O_4$ are substantially the same, and the image depth of the third disparity and the fourth disparity are generated according to the third depth setting command and the fourth depth setting command of the third viewer $O_3$ and the fourth viewer $O_4$.

In the aforementioned embodiments, the third viewer $O_3$ and the fourth viewer $O_4$ located in different displaying areas Z are used as an example. That is, the third viewer $O_3$ and the fourth viewer $O_4$ may stand on different positions, but see the same images. However, the present disclosure is not limited thereto. In practical applications, the third viewer $O_3$ and the fourth viewer $O_4$ can be in the same two view angles and also in the same displaying area Z. In this situation, the stereoscopic display 100 can also adjust the disparity observed by the third viewer $O_3$ and the fourth viewer $O_4$ according to the third depth setting command and the fourth depth setting command of the third viewer $O_3$ and the fourth viewer $O_4$.

As a result, according to the embodiments of the present disclosure described above, no matter whether viewers are in the same two view angles or the different two view angles, because the stereoscopic display 100 is capable of adjusting the disparity between two images provided by two different view angles, the stereoscopic display 100 can independently adjust the image depths observed by each of viewers according to the depth setting commands of the viewers.

Figure 4:
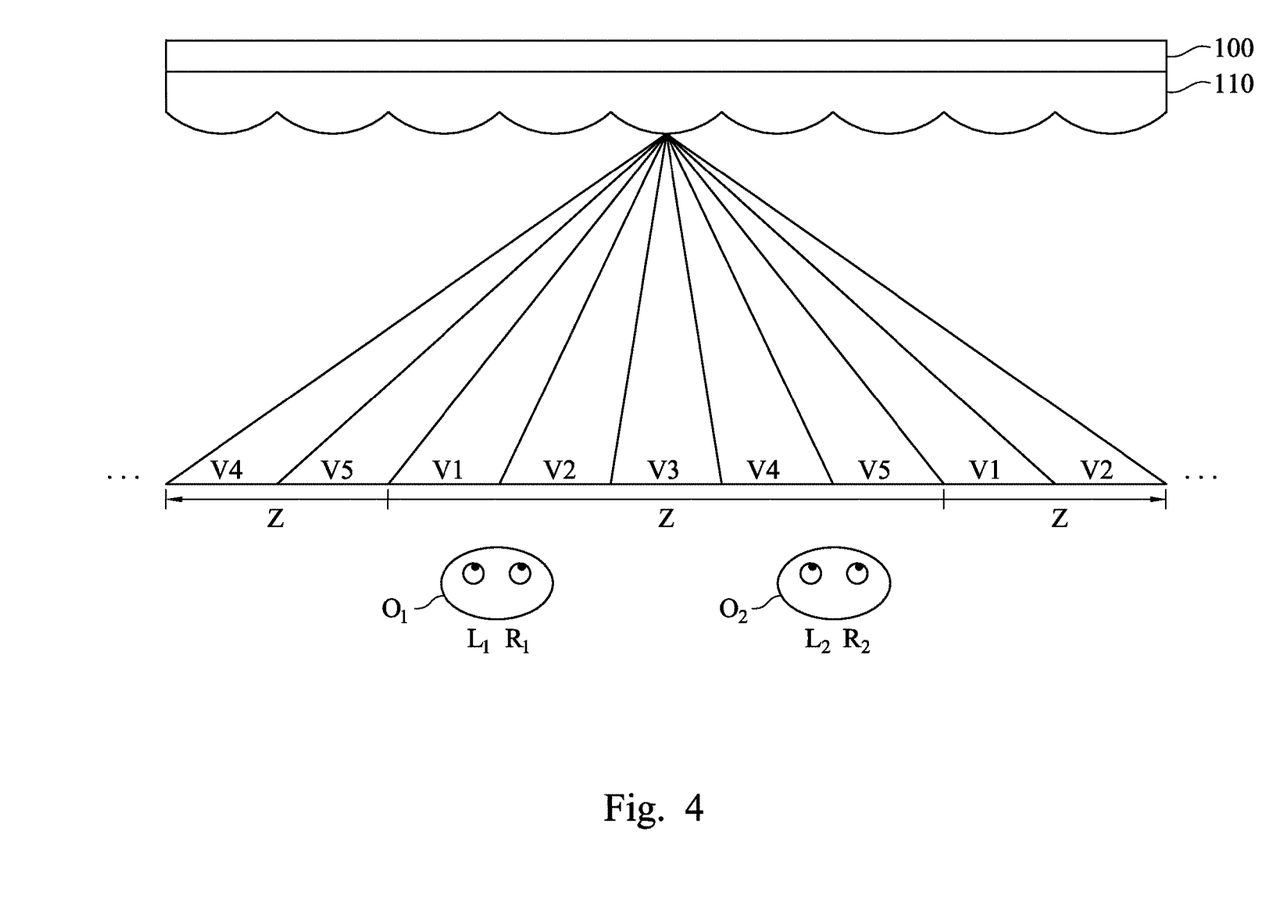
FIG. 4 is a schematic diagram showing the stereoscopic display and the viewers according to another embodiment of the present disclosure.

FIG. 4 is a schematic diagram showing the stereoscopic display and the viewers according to another embodiment of the present disclosure. In the embodiment of FIG. 4, two view angles in the displaying area Z of the stereoscopic display 100 have no viewer, the image displaying method further includes the following steps.

(1.1) If the two of the N view angles corresponding to no viewer are located closer to the first viewer $O_1$ than to the second viewer $O_2$, at least one image of the two view angles corresponding to no viewer is adjusted according to the first depth setting command. For example, in the embodiment of FIG. 4, the second view angle V2 and the third view angle V3 have no viewer, and the second view angle V2 and the third view angle V3 are located closer to the first viewer $O_1$ than to the second viewer $O_2$. In this situation, the stereoscopic display 100 adjusts the disparity between the second view angle V2 and the third view angle V3 according to the first depth setting command $D_1$ of the first viewer $O_1$. As a result, if the first viewer $O_1$ suddenly moves to the second view angle V2 and the third view angle V3, the first viewer $O_1$ can still observe the same disparity (the first disparity) that observed by the first viewer $O_1$ in the first view angle V1 and the second view angle V2.

In yet another embodiment, the stereoscopic display 100 may not adjust the disparity between the images of two view angles that have no viewer. That is, if there is no viewer located in two of the N view angles, the image displaying method further includes the following steps.

(1.2) A predetermined disparity is used as a disparity between the two view angles that have no viewer. As a result, the disparity between the second view angle V2 and the third view angle V3 does not change according to other depth setting commands transmitted by other viewers.

In another embodiment, as illustrated in FIG. 4, if there is no viewer between the first viewer $O_1$ and the second viewer $O_2$ within the displaying area Z, the image displaying method further includes the following steps.

(1.3) At least one image of the two view angles that have no viewer is adjusted according to the first depth setting command, the second depth setting command and two weighting parameters respectively corresponding to the first depth setting command and the second depth setting command.

For example, the second view angle V2 and the third view angle V3 in FIG. 4 are located between the first viewer $O_1$ and the second viewer $O_2$. The first depth setting command of the first viewer $O_1$ includes a first depth setting value, and the second depth setting command of the second viewer $O_2$ includes a second depth setting value. The depth setting value described herein contains information relating to the distance of an object from a view angle. By adjusting the depth setting value, the disparity, e.g. the displacement, of two adjacent images of an object can be changed, and when the left eye and the right eye of a viewer receives two images having the disparity, the viewer perceives the 3D effect. More specifically, the images displayed by two sets of pixels can be adjusted according to the depth setting value, such as adjusting the greyscale of the pixels, so that the disparity, e.g. the displacement, of two adjacent images of the object can be changed. The stereoscopic display 100 can perform a weighting calculation on the first depth setting value and the second depth setting value to obtain a weighting depth value. The stereoscopic display 100 adjusts the disparity between two images provided by the second view angle V2 and the third view angles V3 according to the weighting depth value. As a result, when the first viewer $O_1$ and the second viewer $O_2$ suddenly move to other view angles e.g. the view angles V2, V3 or the view angles V3, V4, the first viewer $O_1$ and the second viewer $O_2$ still observe the disparity that close to the first viewer $O_1$ and the second viewer $O_2$ observe in the original view angles.

The embodiments described above provide three methods to adjust the disparity between images provided by two view angles corresponding to no viewer. In the practical application, any one of methods can be applied to adjust the disparity between images provided by two view angles corresponding to no viewer according to the actual needs.

Figure 5:
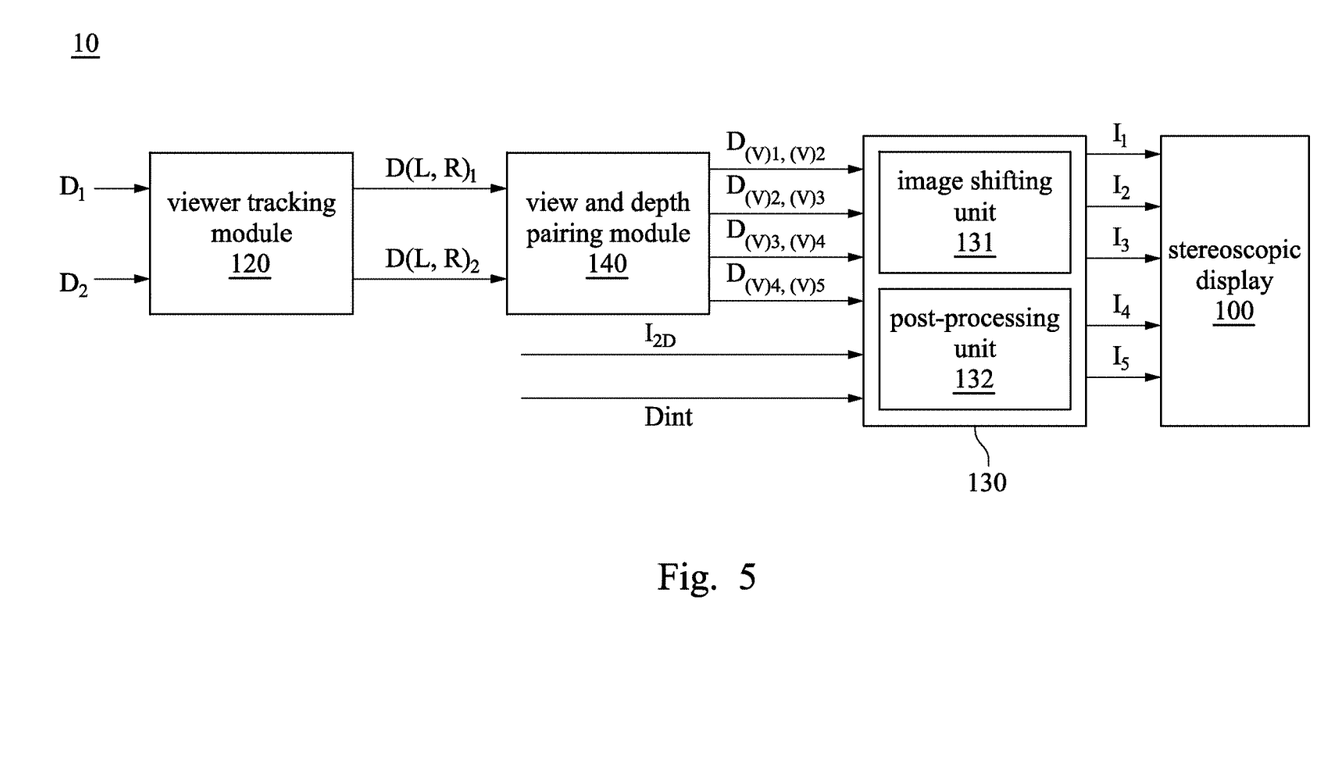
FIG. 5 is a circuit block diagram of the image displaying device in according to one embodiment of the present disclosure.

FIG. 5 is a circuit block diagram of the image displaying device in according to one embodiment of the present disclosure. The image displaying method described in the above embodiments can be performed by using the circuit diagram in FIG. 5. As illustrated in FIG. 5, the image displaying device 10 includes a stereoscopic display 100, a viewer tracking module 120, a multi-view rendering module 130 and a view and depth pairing module 140. The stereoscopic display 100 provides N view angles with the configuration of a lenticular lens 110, in which N is a natural greater than 3. In the embodiments of FIG. 2 and FIG. 4, N is equal to five. In practical applications, the viewer tracking module 120, the multi-view rendering module 130, and the view and depth pairing module 140 can be performed by firmware, software, hardware, or any combination thereof.

With reference made to FIG. 4 and FIG. 5, the stereoscopic display 100 includes, for example, five view angles V1, V2, V3, V4, V5. If the first viewer $O_1$ and the second viewer $O_2$ in FIG. 4 respectively transmit a first depth setting command $D_1$ and a second depth setting command $D_2$ to the stereoscopic display 100, the viewer tracking module 120 can receive the first depth setting command $D_1$ of the first viewer $O_1$ and the second depth setting command $D_2$ of the second viewer $O_2$. In some embodiments, the viewer tracking module 120 may further detect or determine the position of each of the viewers, so that the first depth setting command $D_1$ and the second depth setting command $D_2$ can be paired with first viewer O1 and the second viewer O2, and can output depth and position information $D(L, R)_1$ and $D(L, R)_2$. The depth and position information $D(L, R)_1$ includes the position information of the left eye and the right eye of the first viewer $O_1$, and the depth and position information $D(L, R)2$ includes the position information of the left eye and the right eye of the second viewer O2.

Thereafter, the view and depth pairing module 140 receives the depth and position information $D(L, R)_1$ and $D(L, R)_2$, and outputs four depth setting results $D_{v(1), v(2)}$, $D_{v(2), v(3)}$, $Dv_{(3), v(4)}$, $D_{v(4), v(5)}$ according to the first and second depth setting commands $D_1$, $D_2$. The multi-view rendering module 130 adjusts at least one image of the five view angles V1, V2, V3, V4, V5 of the stereoscopic display 100 according to four depth setting results $D_{v(1), v(2)}$, $D_{v(2), v(3)}$, $Dv_{(3), v(4)}$, $D_{v(4), v(5)}$. More specifically, the multi-view rendering module 130 of one embodiment adjusts the image displayed by pixels of each of the view angles according to four depth setting results $D_{v(1), v(2)}$, $D_{v(2), v(3)}$, $D_{v(3), v(4)}$, $D_{v(4), v(5)}$, thereby changing at least one image of the view angles V1, V2, V3, V4, V5. The depth setting result $D_{v(1), v(2)}$ is the depth setting parameter of the first view angle V1 and the second view angle V2, which can be obtained by processing the first depth setting command $D_1$ of the first viewer $O_1$. Similarly, the depth setting result $D_{v(4), v(5)}$ is the depth setting parameter of the fourth view angle V4 and the fifth view angle V5, which can be obtained by processing the second depth setting command $D_2$ of the second viewer $O_2$. Other depth setting results $D_{v(2), v(3)}$, $D_{v(3), v(4)}$ are the depth setting parameters of the second view angle V2, the third view angle V3 and the third view angle V3, the fourth view angle V4 respectively. Further, since there is no viewer between the second view angle V2 to the fourth view angle V4, the depth setting results $D_{v(2), v(3)}$, $D_{v(3), v(4)}$ can be obtained from steps (1.1), (1.2) or (1.3) of one or more embodiments described above.

Briefly speaking, from the embodiment of FIG. 5, the step S130 further includes:

(2.1) Outputting N−1 depth setting results according to the first depth setting command and the second depth setting command; and (2.2) Adjusting at least one image of the N view angles of the stereoscopic display 100 according to the N−1 depth setting results, thereby making the first disparity different from the second disparity.

As described in above embodiments, the stereoscopic display 100 independently adjusts the disparity between two images according to the depth setting command transmitted by the viewers. In the embodiments of FIG. 4, the multi-view rendering module 130 of the stereoscopic display 100 modifies the first disparity of two images received by the first viewer $O_1$ according to the first depth setting command $D_1$, and modifies the second disparity of two images received by the second viewer $O_2$ according to the second depth setting command $D_2$. Furthermore, the multi-view rendering module 130 also adjusts disparity between two images provided by two view angles that have no viewer according to the step (1.1), step (1.2) or step (1.3).

Figure 6:
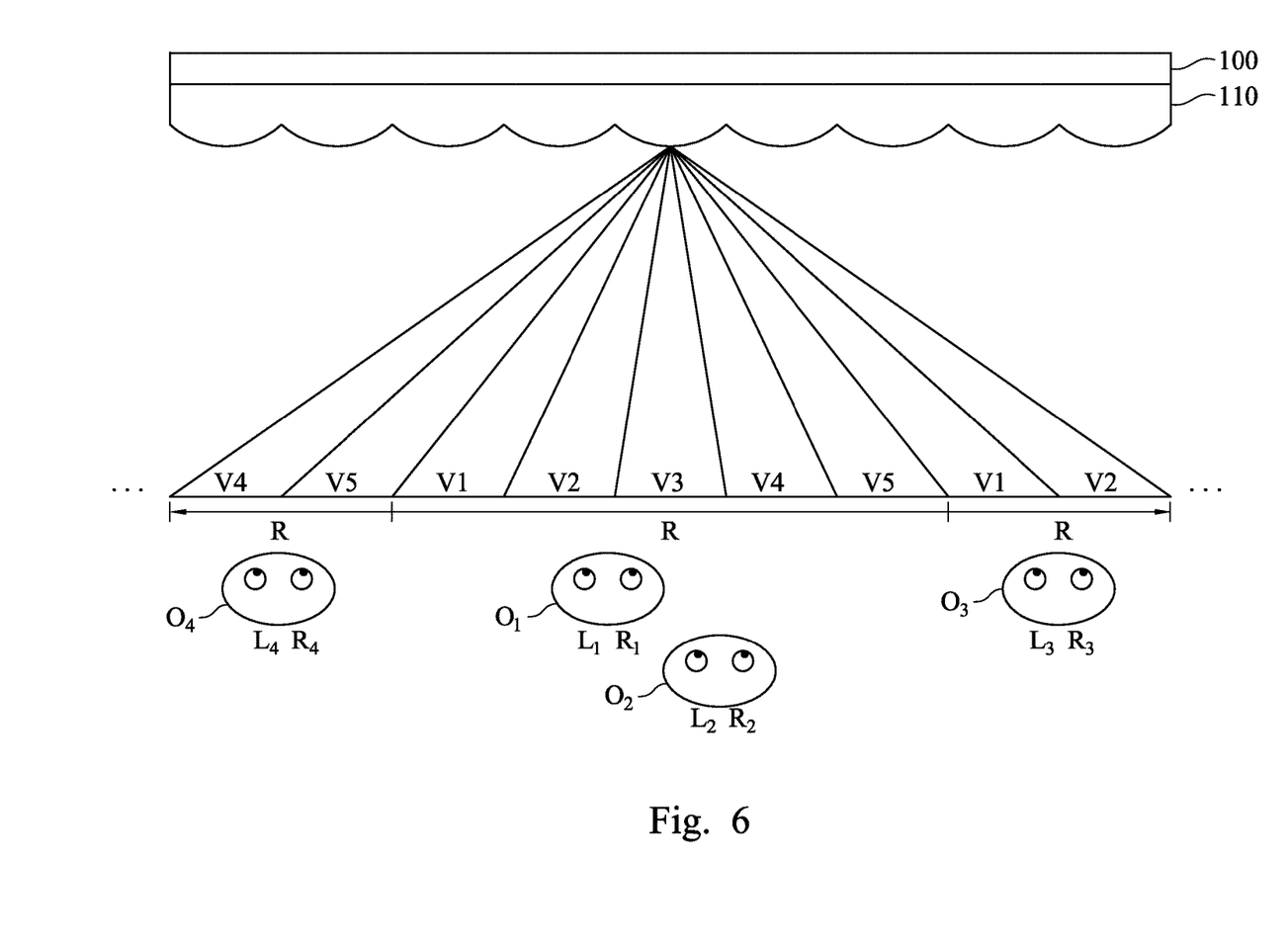
FIG. 6 is a schematic diagram of the stereoscopic display and the viewers according to yet another embodiment of the present disclosure.

FIG. 6 is a schematic diagram of the stereoscopic display and the viewers according to yet another embodiment of the present disclosure. With reference made to FIG. 5 and FIG. 6, the first viewer $O_1$ and the second viewer $O_2$ have an overlapped view angle. More specifically, the first viewer $O_1$ is in the second view angle V2 and the third view angle V3, and the second viewer $O_2$ is in the third view angle V3, and the fourth view angle V4, in which the third view angle V3 is the overlapped view angle. The multi-view rendering module 130 adjusts respective images provided by non-overlapped view angles, e.g. the second view angle V2 and the fourth view angle V4, corresponding to the first viewer $O_1$ and the second viewer $O_2$ on the basis of the image provided by the overlapped view angle, e.g. the third view angle V3, according to the first depth setting command $D_1$ and the second depth setting command $D_2$.

Figure 7:
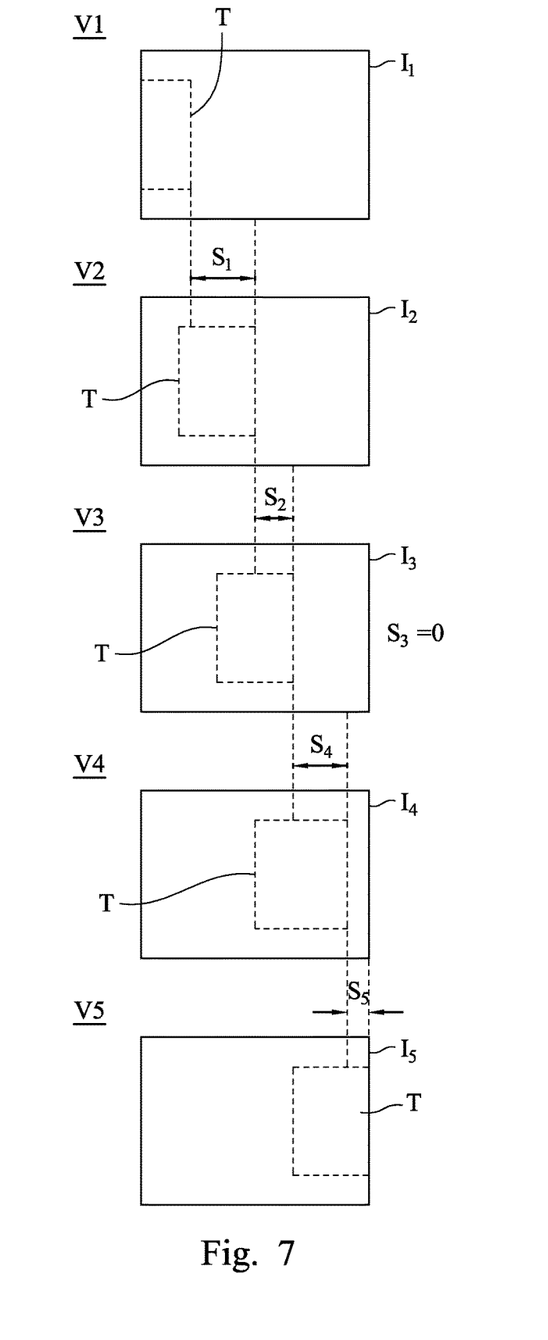
FIG. 7 is an image-shift diagram according to one embodiment of the present disclosure.

FIG. 7 is an image-shift diagram according to one embodiment of the present disclosure. FIG. 7 shows images $I_1$, $I_2$, $I_3$, $I_4$, and $I_5$, of the view angles V1, V2, V3, V4, V5, and each of the images $I_1$, $I_2$, $I_3$, $I_4$, and $I_5$ illustrates an object T. The shift of the object T is illustrated in each of the images $I_1$, $I_2$, $I_3$, $I_4$, and $I_5$ to obtain a better understanding of the present embodiments. It is noted that, although the object T in FIG. 7 shifts horizontally for explaining aspects of the present disclosure, the claimed scope of the present disclosure is not limited in this regard. In other embodiments, the object T may not merely horizontally shift among different images $I_1$, $I_2$, $I_3$, $I_4$, and $I_5$. Other image shift relationship may also cause a disparity between two of the images $I_1$, $I_2$, $I_3$, $I_4$, and $I_5$ to enable viewers to perceive the 3D object T.

With reference made to Table 1, the relationships between each of the view angles V1, V2, V3, V4, V5 and the image-shift value are disclosed below.

TABLE 1

| view angle | Image-shift value |
| --- | --- |
| V1 | $-S_2 - S_1$ |
| V2 | $-S_2$ |
| V3 | 0 |
| V4 | $+S_4$ |
| V5 | $+S_4 + S_5$ |

From the FIG. 7 and table 1, in the embodiment of FIG. 6, if the third view angle V3 is an overlapped view angle, the multi-view rendering module 130 adjusts images $I_2$, $I_4$ provided by the second view angle V2 and the fourth view angle V4 on the basis of the image $I_3$ of the third view angle V3, in which the characters (+) and (−) in Table 1 denote the image shift direction. The character (−) can be defined as the movement of the image towards left direction, and the character (+) can defined as the movement of the image towards right direction, but the present disclosure is not limited in this regard. The multi-view rendering module 130 shifts the image $I_2$ provided by the second view angle V2 with shift value of $-S_2$ pixels according to the first depth setting command $D_1$, and shifts the image $I_4$ provided by the fourth view angle V4 with shift value of $+S_4$ pixels according to the second depth setting command $D_2$. When the first depth setting command $D_1$ is different from the second depth setting command $D_2$, the image shift value $S_2$ is not equal to the image shift value $S_4$. Therefore, although the first viewer $O_1$ and the second viewer $O_2$ has an overlapped view angle, e. g. the third view angle V3, the first viewer $O_1$ and the second viewer $O_2$ observe the image depth of their own requirements.

With reference made to FIG. 6, FIG. 7, and Table 1, if the third viewer $O_3$ is in the first view angle V1 and the second view angle V2, the fourth viewer $O_4$ is in the fourth view angle V4 and the fifth view angle V5, and the third viewer $O_3$ and the fourth viewer $O_4$ respectively transmit their own depth setting commands to the stereoscope display 100, the image-shift value between the first view angle V1 and the second view angle V2 is determined according to the depth setting command of the third viewer $O_3$ by shifting $-S_1$ pixels (or sub-pixels) on the basis of the second view angle V2. In the same way, the image-shift value between the fourth view angle V4 and the fifth view angle V5 is determined according to the depth setting command of the fourth viewer $O_4$ by shifting $+S_5$ pixels (or sub-pixels) on the basis of the fourth view angle V4. Similarly, when the depth setting commands of the first, second, third and fourth viewers $O_1$, $O_2$, $O_3$, and $O_4$ are different, the image shift values $S_1$, $S_2$, $S_3$, $S_4$, and $S_5$ are also different. As a result, the images $I_1$, $I_2$, $I_4$ and $I_5$ asymmetrically shift on the basis of the image $I_3$, so that the first, second, third and fourth viewers $O_1$, $O_2$, $O_3$, and $O_4$ can respectively observe different image depths.

The present disclosure is not limited to the asymmetrically shifting method of the images described above. In some cases, for example in FIG. 6, the second viewer $O_2$ and the fourth viewer $O_4$ overlap on the fourth view angle V4. If the second viewer $O_2$ and the fourth viewer $O_4$ respectively transmit different depth setting commands, the multi-view rendering module 130 can merely adjust the image $I_4$ of the fourth view angle V4, and maintain the image $I_3$, $I_5$ of the third view angle V3, and the fifth view angle V5. Therefore, the second viewer $O_2$ and the fourth viewer $O_4$ can observe the images with different disparities.

Briefly speaking, the image shift values $S_1$, $S_2$, $S_3$ and $S_4$ among the view angles V1, V2, V3, V4, V5, may be unequal, which are determined according to the depth setting commands of the first to the fourth viewers $O_1$, $O_2$, $O_3$, $O_4$. Furthermore, the total shift value $S_{v,\,total}$ of the images $I_1$, $I_2$, $I_4$ and $I_5$ provided by the view angles V1, V2, V4, and V5 on the basis of the image $I_3$ can be determined by the following equations, in which the image shift value $S_3$ of the image $I_3$ is zero, and v is a view angle:

$$S_{v,total}=S_{v-1}+S_v, v>3 \text{ 且 } S_3=0; \text{ and}$$

$$S_{v,total}=S_{v+1}+S_v, v<3 \text{ 且 } S_3=0$$

Thus, from FIG. 6, FIG. 7 and Table 1, the shift value $S_2$ of the object T corresponding to the first viewer $O_1$ results in the first disparity between two images provided by the second view angle V2 and the third view angle V3; the shift value $S_3$ of the object T corresponding to the second viewer $O_2$ results in the second disparity between two images provided by the third view angle V3 and the fourth view angle V4; the shift value $S_4$ of the object T corresponding to the third viewer $O_3$ results in the third disparity between two images provided by the first view angle V1 and the second view angle V2; the shift value $S_5$ of the object T corresponding to the fourth viewer $O_4$ results in the fourth disparity between two images provided by the fourth view angle V4 and the fifth view angle V5. The value of the depth shift values $S_1$, $S_2$, $S_4$, $S_5$ are determined by the depth setting commands transmitted by the first to the fourth viewers $O_1$, $O_2$, $O_3$, $O_4$.

It is noted that the image shift value of each of the view angles in Table 1 uses the third view angle V3 as a middle view angle which does not shift the image, but the present disclosure is not limited to this regard. In other embodiments, the designer can determine any view angle which does not shift the image. For example, as illustrated in Table 2, the first view angle V1 is determined not to shift the image. Thus, the shift relationship from the image $I_1$ of the first view angle V1 to the image $I_5$ of the last view angle (the fifth view angle V5) is towards to the same direction.

TABLE 2

| view angle | Image-shift value |
|---|---|
| V1 | 0 |
| V2 | $+S_2$ |
| V3 | $+S_2 + S_3$ |
| V4 | $+S_2 + S_3 + S_4$ |
| V5 | $+S_2 + S_3 + S_4 + S_5$ |

In the step S230 in FIG. 3 and in the steps (1.1), (1.2), (1.3), the weighting depth value of each of the view angles is determined by the view and depth pairing module 140 shown in FIG. 5. In more detail, in the embodiment of FIG. 2 and the step S230, if two view angles of the third viewer $O_3$ both overlap with two view angles of the fourth viewer $O_4$, and the third viewer $O_3$ and the fourth viewer $O_4$ are in different displaying areas Z, the view and depth pairing module 140 outputs a depth setting result according to the third depth setting command of the third viewer $O_3$, the fourth depth setting command of the fourth viewer $O_4$, and the two weighting parameters respectively corresponding to the third and the fourth depth setting commands.

For example, the third depth setting result may include a third depth setting value $D_3$, the fourth depth setting result may include a fourth depth setting value $D_4$, and the depth setting result may include a weighting depth value $D_f$. If two weighting parameters of the third viewer $O_3$ and the fourth viewer $O_4$ are respectively determined as ½, the weighting depth value Df equals to (D3+D4)/2. The weighting depth value Df is included in the depth setting result $D_{v(4),\,v(5)}$. The multi-view rendering module 130 adjusts the disparity between two images provided by the third viewer $O_3$ and the fourth viewer $O_4$ of the stereoscopic display 100 according to the depth setting result $D_{v(4),\,v(5)}$.

Similarly, in the step (1.1), if two of the N view angles corresponding to no viewer are located closer to the first viewer $O_1$ then to the second viewer $O_2$, the view and depth pairing module 140 determines that the weighting parameter of the first viewer $O_1$ is one. Thus, the multi-view rendering module 130 adjusts at least one image of the two view angles that have no viewer according to the first depth setting command $D_1$.

In the step (1.2), the multi-view rendering module 130 uses a predetermine disparity as a disparity between the two view angles that have no viewer. That is, the view and depth pairing module 140 determines that the weighting parameter of viewers adjacent or close to the two view angles that have no viewer are zero.

In the step (1.3), the first viewer $O_1$ and the second viewer $O_2$ are located adjacent to two sides of the two view angles that have no viewer, and the view and depth pairing module 140 determines that the weighting parameters of the first viewer $O_1$ and the second viewer $O_2$ are ½.

Then, after the view and depth pairing module 140 outputs the depth setting results $D_{v(1),\,v(2)}$, $D_{v(2),\,v(3)}$, $D_{v(3),\,v(4)}$, $D_{v(4),\,v(5)}$ of the view angles V1, V2, V3, V4, V5, further explanation of the mechanism of adjusting the images $I_1$, $I_2$, $I_3$, $I_4$, $I_5$ by the view and depth pairing module 140 is provided in following description.

With reference made to FIG. 5, the multi-view rendering module 130 includes an image shifting unit 131 and a processing unit 132. Taking FIG. 2 as an example, the depth setting result $D_{v(1),\,v(2)}$ further includes a first depth setting value of the first viewer $O_1$, the depth setting result $D_{v(2),\,v(3)}$ further includes a second depth setting value of the second viewer $O_2$, the depth setting value of the depth setting result $D_{v(3),\,v(4)}$ is determined by the step (1.1), (1.2) or (1.3), and the depth setting value of the depth setting result $D_{v(4),\,v(5)}$ can include a weighting depth value, which is obtained by performing a weighting calculation of the third viewer $O_3$ and the fourth viewer $O_4$.

The image shifting unit 131 is configured to normalize an initial image depth setting value $D_{int}$ to the depth setting results $D_{v(1),\,v(2)}$, $D_{v(2),\,v(3)}$, $D_{v(3),\,v(4)}$、$D_{v(4),\,v(5)}$ of each of the view angles V1, V2, V3, V4, V5. Taking an image with 8 bits as an example, the initial image depth setting value $D_{int}$ (may in a range of [0, 255]. The image shifting unit 131 is capable of normalizing the depth range of [0, 255] to the depth range of [0, D], where D is the depth setting results $D_{v(1),\,v(2)}$、$D_{v(2),\,v(3)}$、$D_{v(3),\,v(4)}$、$D_{v(4),\,v(5)}$ of each of the view angles V1, V2, V3, V4, V5. Then, the processing unit 132 outputs each of the images $I_1$, $I_2$, $I_3$, $I_4$, $I_5$ to the stereoscopic display 100 according to the 2D image information $I_{2D}$ of each of the view angles V1, V2, V3, V4, V5 and the normalization results of the image shifting unit 131. Through the normalization results of the image shifting unit 131, the processing unit 132 can output each of the images $I_1$, $I_2$, $I_3$, $I_4$, $I_5$ according to the first depth setting value, the second depth setting value or the weighting depth value.

In sum, with the applications of the image displaying device and the image displaying method of the above embodiments, when the viewers are in different view angles, each of the viewers may independently adjust the 3D effect of the image according to their own requirements. The stereoscopic display independently adjusts the disparity between two images corresponding to each of the viewers according to the depth setting commands transmitted by each of the viewers. For example, the stereoscopic display may independently adjust the disparity between two images displayed by corresponding pixels. Thus, after the images displayed by the corresponding pixels and projected by the optical element, e.g. the lenticular lens, to the different view angles, the disparities between two different images may be different.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An image displaying method adapted to operate on a stereoscopic display, the stereoscopic display comprising N view angles, wherein N is a natural number greater than 3, the image displaying method comprising:
   receiving N images provided by the N view angles;
   receiving a first depth setting command from a first viewer, wherein there is a first disparity between two of the N images observed by the first viewer through two of the N view angles;
   receiving a second depth setting command from a second viewer, wherein there is a second disparity between two of the N images observed by the second viewer through two of the N view angles;
   adjusting at least one of the N images provided by at least one of the N view angles of the stereoscopic display to form at least one adjusted image according to the first depth setting command and the second depth setting command, thereby making the first disparity different from the second disparity;
   wherein if the first viewer and the second viewer have an overlapped view angle, such that making the first disparity different from the second disparity further comprises adjusting respective images provided by non-overlapped view angles corresponding to the first viewer and the second viewer on the basis of the overlapped view angle according to the first depth setting command and the second depth setting command;
   displaying the adjusted image on the stereoscopic display;
   adjusting a disparity between two of the N view angles corresponding to no viewer, wherein the image displaying method using a predetermined disparity as the disparity; and
   wherein if two of the N view angles corresponding to no viewer are located closer to the first viewer than to the second viewer, adjusting at least one image provided by at least one of the two view angles corresponding to no viewer according to the first depth setting command.

2. The image displaying method of claim 1, wherein making the first disparity different from the second disparity further comprises:
   outputting N-1 depth setting results according to the first depth setting command and the second depth setting command; and
   adjusting the at least one image provided by the at least one of the N view angles of the stereoscopic display according to the N-1 depth setting results, thereby making the first disparity different from the second disparity.

3. The image displaying method of claim 1, wherein making the first disparity different from the second disparity further comprises:
   modifying the first disparity by adjusting the two images respectively provided by the view angles corresponding to the first viewer according to the first depth setting command; and
   modifying the second disparity by adjusting the two images respectively provided by the view angles corresponding to the second viewer according to the second depth setting command.

4. The image displaying method of claim 1, if there are a portion of the N view angles included between the first viewer and the second viewer, and two of the portion of the N view angles are corresponding to no viewer, the image displaying method further comprising:
   adjusting at least one image provided by the at least one view angles corresponding to no viewer according to the first depth setting command, the second depth setting command and two weighting parameters respectively corresponding to the first depth setting command and the second depth setting command.

5. The image displaying method of claim 1, wherein the first depth setting command comprises a first depth setting value, the second depth setting command comprises a second depth setting value, and making the first disparity different from the second disparity further comprises:
   normalizing a first predetermined depth value to the first depth setting value, so as to adjust the first disparity; and
   normalizing a second predetermined depth value to the second depth setting value, so as to adjust the second disparity.

6. An image displaying method adapted to operate on a stereoscopic display, the stereoscopic display comprising N view angles, wherein N is a natural number greater than 3, the image displaying method comprising:
   receiving N images provided by the N view angles;
   receiving a first depth setting command from a first viewer, wherein there is a first disparity between two of the N images observed by the first viewer through two of the N view angles;
   receiving a second depth setting command from a second viewer, wherein there is a second disparity between two of the N images observed by the second viewer through two of the N view angles;
   if the first viewer and the second viewer have one overlapped view angle, adjusting at least one of the N images provided by at least one of the N view angles of the stereoscopic display to form at least one adjusted image according to the first depth setting command and the second depth setting command, thereby making the first disparity different from the second disparity, and wherein making the first disparity different from the second disparity further comprises adjusting respective images provided by non-overlapped view angles corresponding to the first viewer and the second viewer on the basis of the overlapped view angle according to the first depth setting command and the second depth setting command;
   if two view angles corresponding to the first viewer both overlap with two view angles corresponding to the second viewer, outputting a depth setting result according to the first depth setting command, the second depth setting command and two weighting parameters respectively corresponding to the first depth setting command and the second depth setting command, and adjusting the two images provided by two of the N view angles corresponding to the first viewer and the second viewer to form two adjusted images according to the depth setting result;

displaying the two adjusted images on the stereoscopic display;

adjusting a disparity between two of the N view angles corresponding to no viewer, wherein the image displaying method using a predetermined disparity as the disparity; and wherein if two of the N view angles corresponding to no viewer are located closer to the first viewer than to the second viewer, adjusting at least one image provided by at least one of the two view angles corresponding to no viewer according to the first depth setting command.

7. The image displaying method of claim 6, wherein the depth setting result comprises a weighting depth value, and adjusting the two images corresponding to the first viewer and the second viewer further comprises:

normalizing a third predetermined depth value to the weighting depth value; and adjusting the first disparity and the second disparity according to the weighting depth value, thereby making the first disparity the same as the second disparity.

* * * * *

UNITED STATES PATENT AND TRADEMARK OFFICE
CERTIFICATE OF CORRECTION

PATENT NO. : 9,998,733 B2  
APPLICATION NO. : 14/595603  
DATED : June 12, 2018  
INVENTOR(S) : Effendi et al.

Page 1 of 1

It is certified that error appears in the above-identified patent and that said Letters Patent is hereby corrected as shown below:

On the Title Page

Item (12) should read:  
(12) United States Patent  
Effendi et al.

Item (72) Inventors should read:  
(72) Inventors: Effendi, Hsin-Chu (TW);  
                Fu-Chuan Tsai, Hsin-Chu (TW);  
                Chia-Pu Ho, Hsin-Chu (TW)

Signed and Sealed this  
Sixth Day of November, 2018

Andrei Iancu  
*Director of the United States Patent and Trademark Office*